(12) United States Patent
Kalm

(10) Patent No.: US 10,934,091 B1
(45) Date of Patent: Mar. 2, 2021

(54) MODULAR INDEXING TOTE STORAGE SYSTEM

(71) Applicant: Amazon Technologies, Inc., Seattle, WA (US)

(72) Inventor: William Scott Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 16/368,528

(22) Filed: Mar. 28, 2019

(51) Int. Cl.
*B65G 1/137* (2006.01)

(52) U.S. Cl.
CPC .... *B65G 1/1376* (2013.01); *B65G 2201/0258* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,661,280 A | * | 5/1972 | Atwater | B65G 1/0407 414/282 |
| 4,542,808 A | * | 9/1985 | Lloyd, Jr. | B65G 1/1376 186/56 |
| 5,380,139 A | * | 1/1995 | Pohjonen | B65G 1/0435 414/273 |
| 5,636,966 A | * | 6/1997 | Lyon | B65G 1/1378 414/791.6 |
| 6,061,607 A | * | 5/2000 | Bradley | B65G 1/1376 414/273 |
| 9,540,171 B2 | * | 1/2017 | Elazary | B25J 9/1697 |

* cited by examiner

*Primary Examiner* — Kyle O Logan
(74) *Attorney, Agent, or Firm* — Kilpatrick Townsend & Stockton LLP

(57) ABSTRACT

Item storage systems can be used to sort and store items within an inventory system. The item storage system can include platforms for moving the items about the exterior of a storage structure. The platforms may move the items along a height of the storage structure and include an item movement device and item translation device. The item movement device may move items into and out of the storage structure and the item translation device may move items along the length of the platform.

20 Claims, 8 Drawing Sheets

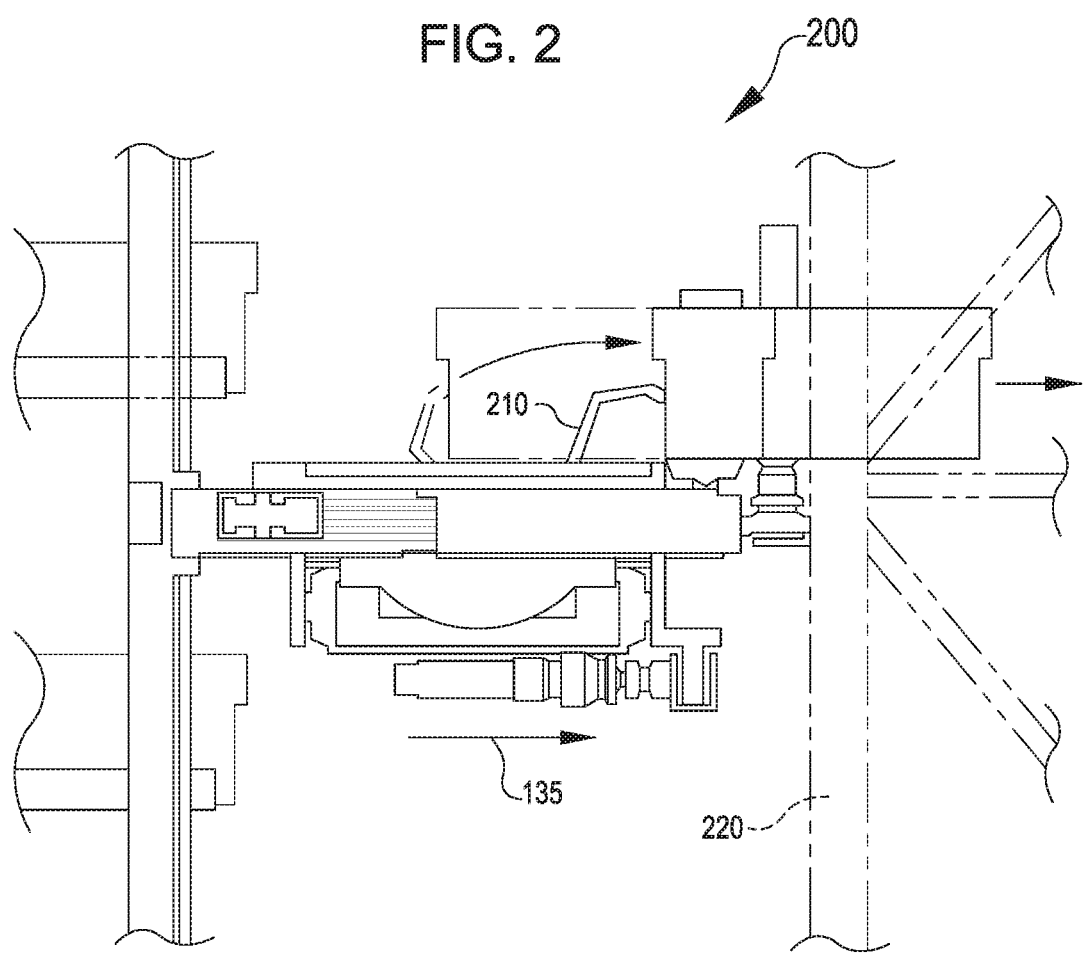

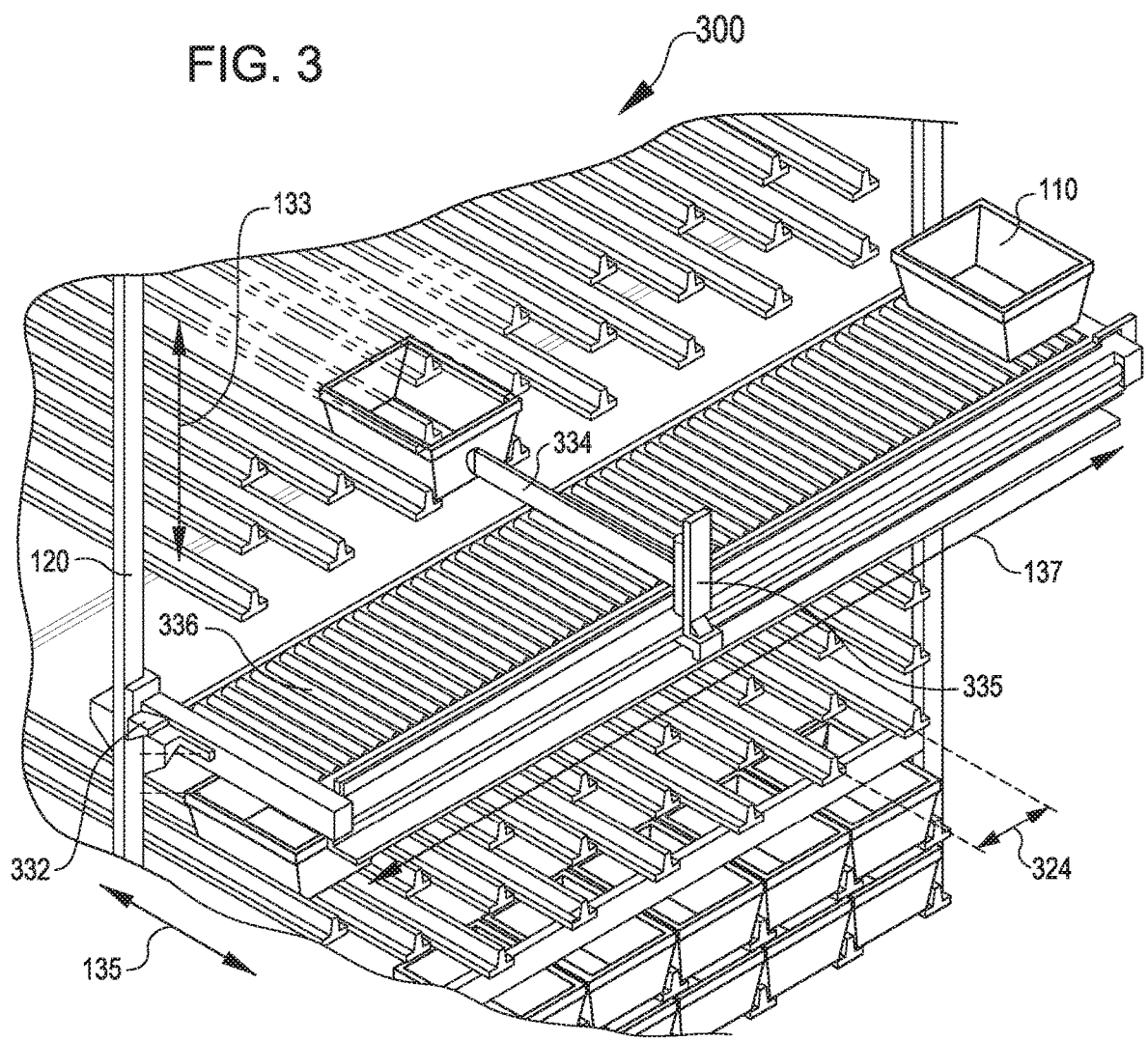

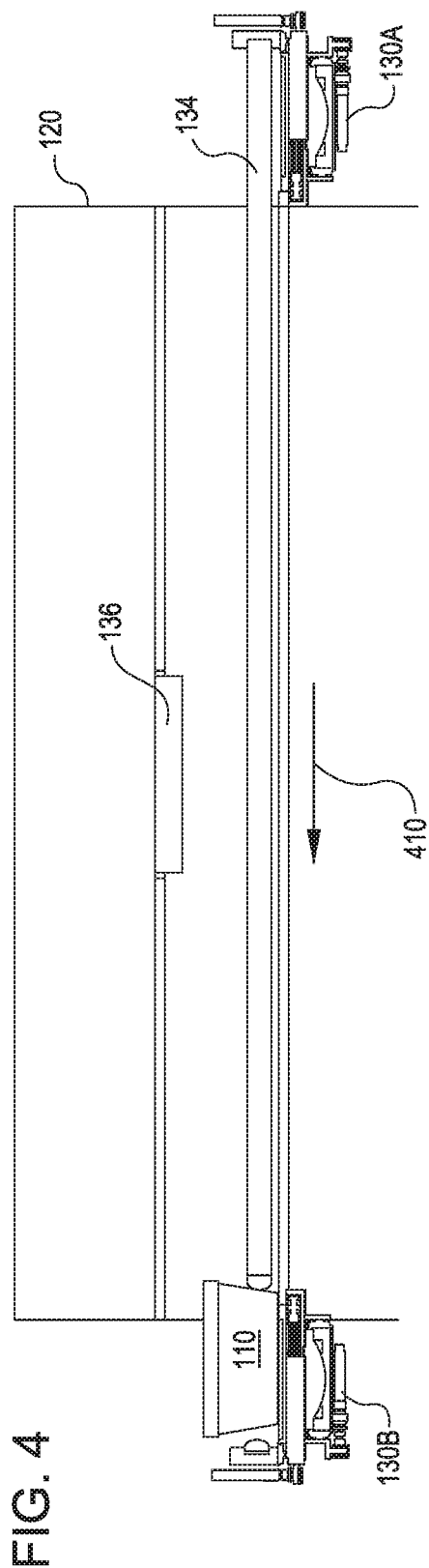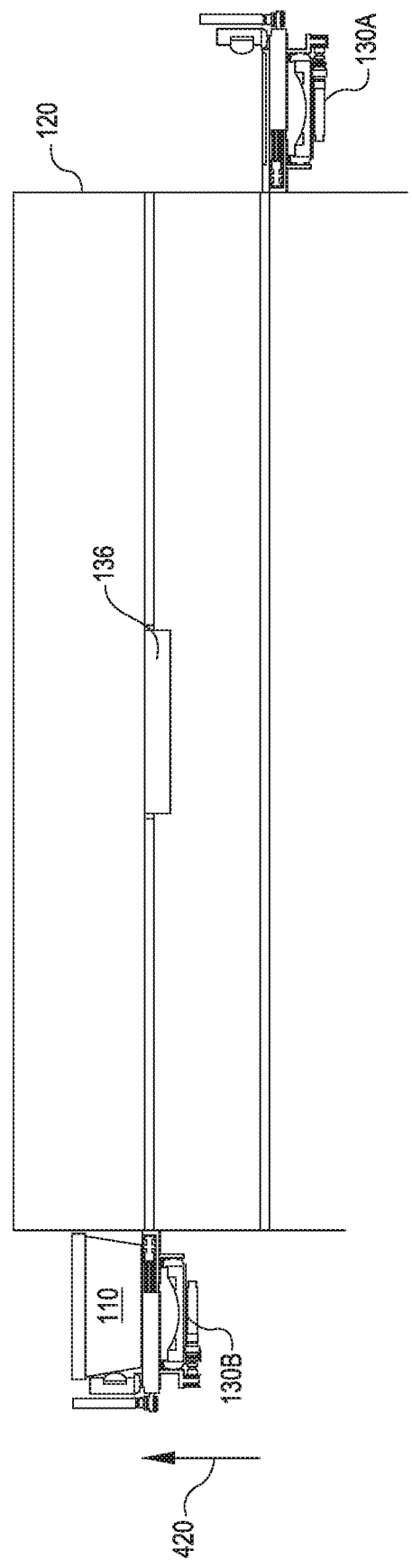

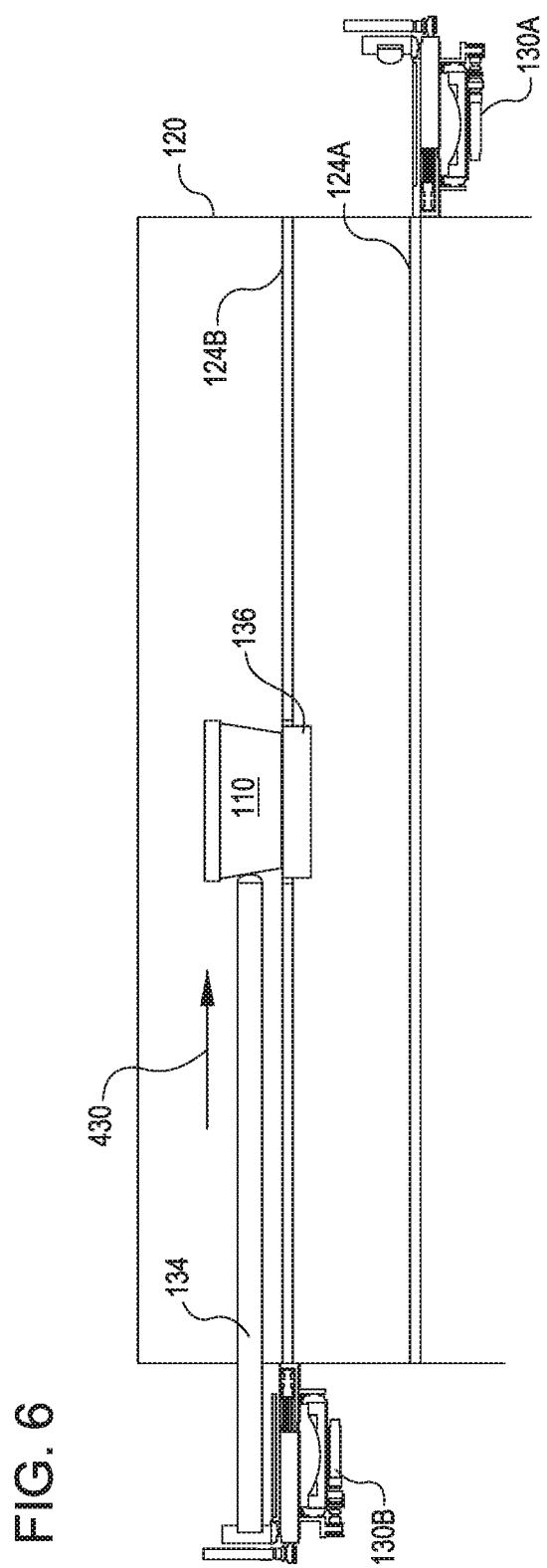

MODULAR INDEXING TOTE STORAGE SYSTEM

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space, equipment, and manpower, can result in lower throughput, unacceptably long response times, an ever-increasing backlog of unfinished tasks, and, in general, poor system performance. Additionally, once an inventory storage location has been filled to capacity with items and equipment, the cost of adding additional space or moving the items and equipment to a secondary location may be prohibitively expensive, limiting the ability of the location to accommodate additional items.

BRIEF DESCRIPTION OF THE DRAWINGS

Various embodiments in accordance with the present disclosure will be described with reference to the drawings, in which:

FIG. 2 illustrates a side view of an example platform including a right angle transfer that may be utilized in particular embodiments of the storage system shown in FIG. 1;

FIG. 3 illustrates an example platform including an indexing conveyor that may be utilized in particular embodiments of the storage system shown in FIG. 1;

FIGS. 4-6 illustrate side views of various stages or states in an example of a re-organizing process that may be performed by an example item storage system of FIG. 1, in accordance with at least one embodiment;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having an inventory holder and containers that may be received in the inventory holder for organizing items. Specifically, features herein are directed to items in a storage structure and a platform for moving the items about the storage structure. The platform may travel up and down the exterior of the storage structure, stopping at various points along the height of the storage structure. The platform can include or interact with features for moving the platform and/or moving items relative to the platform. For example, the platform may include or interact with a platform movement device, an item movement device, and an item translation device. The platform movement device may facilitate or enable movement of the platform as it travels along the height of the storage structure. The item movement device may move items into or out of the storage structure at various points along the height. For example, the item movement device on a first platform on one side of the storage structure may push items in the storage structure onto a second platform positioned on the opposite side of the storage structure. The item translation device may move the item along the length of the platform after it has been received by the platform.

Figure 1:
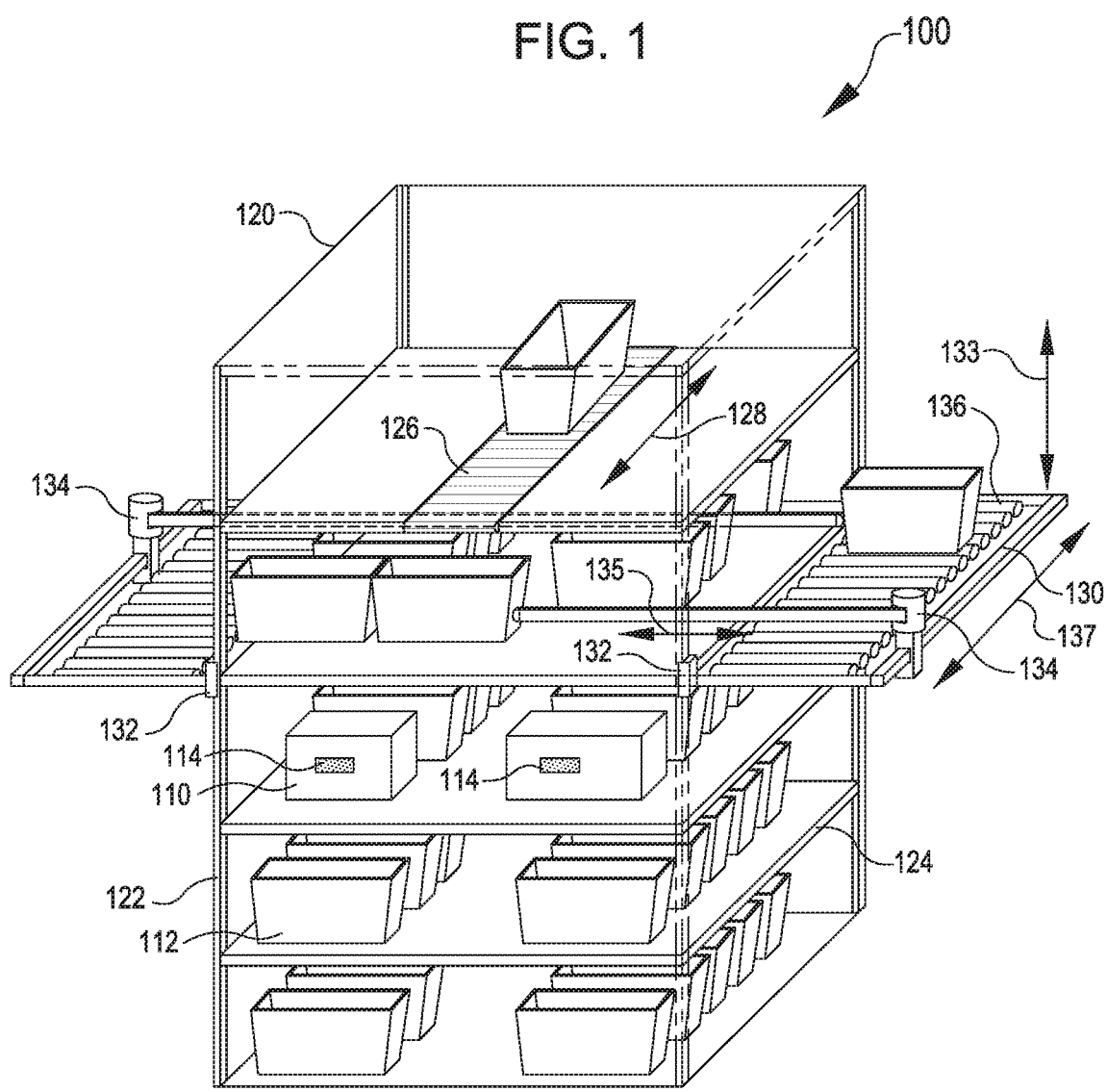
FIG. 1 illustrates an item storage system having a platform configured for moving and organizing items of the storage system according to various embodiments.

Referring now to the drawings in which like-referenced numerals and/or names may refer to like elements, FIG. 1 illustrates an item storage system 100 for moving, organizing and/or storing items 110. The storage system 100 can include items 110, a storage structure 120, and one or more platforms 130. The storage system 100 may include additional or alternative components capable of moving and/or storing items 110.

In operation, the storage structure 120 can contain and support items 110. Each platform 130 may be attached to a side of the storage structure 120 in a manner that allows the platform 130 to move up or down along the height of the storage structure 120. In some embodiments, platforms 130 can be attached to two opposing sides of the storage structure 120 (e.g., a left and a right side). Respective platforms 130 can receive one or more items 110 and move the items 110 around the storage structure 120. For example, the platforms 130 can receive an item 110 at a first height on the storage structure 120. The platform 130 can move the received item 110 from the first height to a second height on the storage structure 120, and the item 110 can be deposited at the second height. In various embodiments, utilizing platforms 130 to move items 110 around the storage structure 120 can improve storage density of items 110 by allowing more items 110 to be stored in a storage structure 120 with a small footprint in comparison to arrangements that lack the platforms 130.

The items 110 can be any goods or inventory found in a warehouse environment and purchased by a user. For example, the items 110 may be a stuffed animal, a plastic vegetable, or an action figure. The items 110 can include an item container referred to herein as a container 112 where one or more items 110 may be placed in a container and moved together as a single unit. For example, the stuffed animal, plastic vegetable, and action figure can be placed in a single container 112 and moved around the storage structure 120 together. The container 112 can be an item tote capable of holding one or more items 110. However, the container 112 is not limited to an item tote and may be a cardboard box, plastic bin, metal bin, or any other container capable of holding items 110 and retaining its structural integrity while being moved around.

The items 110 may include a unique identifier 114. The unique identifier 114 can be a label or markings on the item 110 containing information about the item 110. The information may be used to aid tracking of the item as it moves around a supply chain. The unique identifier 114 can be a marking readable by a human and/or machine. For example, the unique identifier can be a barcode or RFID-encoded serial number. The identifier 114 may be an image, number, letters, and/or a fiducial.

The storage structure 120 can support the items 110 and provide a base for the platforms 130 to move the items 110 around the storage structure 120. The storage structure 120 can include support structures 122 and support surfaces 124. As depicted in FIG. 1, the storage structure 120 includes four vertical support structures 122 and five support surfaces 124. However, the storage structure 120 can include more or less support structures 122 and/or support surfaces 124. In some embodiments the storage structure is shelving unit, storage rack, stacked cubbies, stacked births, and/or stacked lanes. The storage structure 120 may have a height between five feet and seventy-five feet, for example.

The support structures 122 can be capable of holding the weight of the items 110, platforms 130, and support surfaces 124 without losing structural integrity. The support structures 122 may be built in a vertical direction to increase the density of items 110 without changing the area of the footprint of the support structure 120. In various embodiments, the support structures 122 are steel supports. However, the support structures 122 may be formed of any material with a strength to weight ratio similar to steel or otherwise capable of providing the functions of the support structure 122. The support structures 122 can be spaced apart to allow for support surfaces 124 to span between the support structures 122.

The support surfaces 124 can be surfaces where the items 110 are supported during storage. In various embodiments, the support surfaces 124 are shelves. However, the support surfaces 124 are not limited to shelves and may be or include netting, compartments, slots, receptacles, or other suitable elements for holding items 110. In some embodiments, the support surfaces 124 may include features that can facilitate or aid in the movement of the items 110 between the storage structure 120 and the platforms 130. For example, the support surfaces may include rollers or sliders for aiding movement of items 110.

In various embodiments, the storage structure 120 has openings between the support surfaces 124. These openings can allow items 110 to enter the support structure 120 and be supported by the support surfaces 124. These openings may be the entire height between support surfaces 124 or the openings may be smaller than the distance between support surfaces 124.

The support structure 120 can include an interior and an exterior. The interior can contain items 110 during storage and the exterior can support the platforms 130. In various embodiments, the openings allow items 110 to travel from the exterior of the support structure 120 to the interior of the support structure 120.

In various embodiments, the storage structure 120 includes an item 110 conveyance mechanism 126. The conveyance mechanism 126 can be located on one of the support surfaces 124 and move items 110 into and/or out of the storage structure 120. For example, the conveyance mechanism 126 may move items 110 from the storage structure 120 to a secondary environment. The secondary environment can be an additional storage structure 120 (e.g., adjacent to or remote from the first storage structure 120), a different station and/or structure in the warehouse, a truck, or other transportation.

As shown in FIG. 1, the conveyance mechanism 126 is located at the top of the storage structure 120. However, the conveyance mechanism 126 may be located on any of the support surfaces 124, between support surfaces 124, and/or beneath the storage structure 120. In some embodiments, the conveyance mechanism 126 includes a conveyor belt located on a support surface 124. The conveyance mechanism 126 may additionally or alternatively include a lever, arm, and/or a device capable of moving the items 110 onto and/or off of the storage structure 120.

Platforms 130 can be coupled with the storage structure 120 to move the items 110 between the support surfaces 124 and/or reorganize the order or arrangement of the items 110 on the same support surface 124. As depicted in FIG. 1, the storage structure 120 is coupled with two platforms 130 on opposing sides (individually identified as a right side platform 130A and a left side platform 130B). However, more or less than two platforms 130 may be coupled with the storage structure 120. Each platform 130 can include a platform movement device 132, an item movement device 134, and/or an item translation device 136. The platforms 130 can correspond to or include an indexing conveyor belt. However, the platforms 130 may be any moveable platform or device capable of moving items 110 around the storage structure 120.

The platform movement device 132 can move the platform in a first (e.g., vertical or height-wise) direction 133 along the outside of the storage structure 120. The platform movement device 132 can be a rack and pinion system. For example, the rack can be attached to the storage structure 120 and the pinion gear can be attached to the platform 130. A motor can drive the pinion gear to raise and/or lower the platform 130 along the rack. In some embodiments, the platform movement device 132 comprises or corresponds to magnets, one or more propellers, or pulleys attached to the platform 130 and/or the storage structure 120.

The item movement device 134 can engage with items 110 to move the items 110 into or out of the storage structure 120 along a second (e.g., width-wise) direction 135. For example, the item movement device 134 may push and/or pull an item 110 off of the support structure 110 and onto a platform 130. The item movement device 134 can be attached to the platform 130. However, the item movement device 134 may additionally or alternatively be attached to the storage structure 120 or to an additional structure separate from the platform 130 and the storage structure 120.

In some embodiments, the item movement device 134 includes end effectors for engaging with the items 110. The end effectors can include a hook for pushing or pulling the items 110. The end effectors may include magnets, claws, suction devices, and/or other mechanisms for engaging with one or more items 110.

In various embodiments, the item movement device 134 can move along the platform 130 in a third (e.g., depth-wise) direction 137. Moving along the platform 130 in the third direction 137 can allow the item movement device 134 to move items located on any part of a support surface 124. In various embodiments, several item movement devices 134 are attached to the platform 130 along the third direction. For example, each of the several item movement devices 134 may correspond to a row of items 110 in the storage structure 120. In some embodiments, an item movement device 134 is attached to the storage structure 120 to push items 110 onto one or both platforms 130 or onto the conveyance mechanism 126. In some embodiments, the item movement device 134 is or includes an arm. The arm can be coupled with a moveable base to move the arm along the platform in the third direction 137. The item movement device 134 additionally or alternatively may be or include an air jet, magnets, or rollers.

The item translation device 136 can move items 110 on the platform 130 along the third (e.g., depth-wise) direction 137. For example, after an item 110 has been pushed onto the platform 130, the item translation device 136 can move the item 110 along the third direction 137 to allow for additional items 110 to be pushed onto the platform 130 and/or to move the item 110 to a position for storage on a support surface 124. In various embodiments, the item translation device 136 is made of rollers along the platform 130. For example, the item translation device 136 can be motor driven rollers moving the item along the length of the platform 130. The item translation device 136 additionally or alternatively may be or include a conveyor belt, motor driven totes, or a motorized track.

In various embodiments, the platform movement devices 132 on each of the right platform 130A and the left platform 130B are synchronized or otherwise move the platforms 130 to the same height relative to the storage structure 120. In an illustrative example, in operation, the item movement device 134 on the left platform 130B can move an item 110 from the storage structure 120 to the right platform 130A (e.g., along a direction indicated by arrow 135). The item translation device 136 on the right platform 130A moves the item 110 along the length of the right platform 130A (e.g., along a direction indicated by arrow 137) and/or the platform movement device 132 moves the right platform 130A up or down along the height of the storage structure 120 (e.g., in a direction indicated by arrow 133). The item movement device 134 moves the item 110 from the left platform 130B to a support surface 124 along direction 135.

FIG. 2 illustrates a side view of an example platform 130 including a right angle transfer system 200. The right angle transfer system 200 can include an arm 210. The arm 210 can move items 110 off of the platform along direction 135 (e.g., which may be the width-wise direction with respect to FIG. 1). In various embodiments, the arm 210 moves from a storage position inside the platform 130 to a movement position outside the platform 130. In the movement position, the arm 210 can move items 110 from the platform 130 to the storage structure 120 and/or to another structure 220. The right angle transfer system 200 may include additional or alternative elements allowing for items 110 to be moved along direction 135.

FIG. 3 illustrates an example of a platform 130 utilizing an indexing conveyor 300. The indexing conveyor 300 can move and/or organize items 110. The indexing conveyor 300 can include a rack and pinion system 332, a movement arm 334, motor driven rollers 336, or other features that allow it to index items 110 by moving items along the platform 130 and receiving and unload items 100 at multiple points along the platform 130. In contrast, a non-indexing conveyor may only receive or unload items 110 at a single location along the length of the platform 130. The indexing conveyor 300 may include additional or alternative components. In various embodiments, the rack and pinion system 332 moves the indexing conveyor 300 along the support structure 120 in first (e.g., vertical or height-wise) direction 133, the movement arm 334 pushes an item 110 onto the support surface 120 in a second (e.g., width-wise) direction 135, and the indexing conveyor 300 uses the motor driven rollers 336 to move the item in a third (e.g., depth-wise) direction 137.

The rack and pinion system 332 can move the indexing conveyor 300 up and down the storage structure 120 along direction 133. In some embodiments, the rack and pinion system 332 includes a motor mounted on the indexing conveyor 300. The motor has a pinion gear that interfaces with a rack mounted on the support structure 120. As the motor rotates the gear, the indexing conveyor 300 moves up or down along the support structure 120 in direction 133. The rack and pinion system 332 may include multiple motors and pinion gears interfacing with multiple racks.

The movement arm 334 can push items 110 off of the storage structure 120 and/or the indexing conveyor 300. In various embodiments, the movement arm 334 is a chain that can transition between an engagement state and a storage state. In the engagement state the chain can push an item 110 and in the storage state the chain can be coiled. The movement arm 334 may be a solid metal arm, a carbon arm, a plastic arm, or any combination of these and/or other suitable materials that may push and/or pull an item 110.

In various embodiments, the movement arm 334 can be coupled with an arm base 335. The arm base 335 can move the arm along the indexing conveyor 300 along direction 137. Moving the arm base 335 can allow the arm 334 to engage with items 110 positioned anywhere on the storage structure 120. The arm base 335 may include a storage container for storing the movement arm 334 when not in use. For example, the storage container may store the chain when it is in the storage state.

In various embodiments, the movement arm 334 can push items 110 into lanes 324 in the storage structure 120. Multiple lanes 324 can be positioned side by side in a depth-wise direction across the storage structure 120 and span the length of the storage structure 120 in a width-wise direction. The lanes 324 can hold multiple items 110 in the depth-wise direction. The lanes 324 can hold multiple items 110 in the width-wise direction. The lanes 324 may be made of metal, plastic, carbon, or a low friction surface that allows the items 110 to be pushed across the storage structure 120.

The indexing conveyor 300 can include one or more rollers 336 for moving items 110 along direction 137. In various embodiments, the rollers 336 are motor driven rollers that move the items 110. However, rollers 336 may be driven by pulleys or magnets or other driving devices.

In some embodiments, the rollers 336 are motor driven rollers 336 that move items 110 at increments along the length of the indexing conveyor 300. The motor driven rollers can be controlled individually or in groups. For example, the motor driven rollers may be grouped to move the items 110 incremental distances that correspond to the openings of lanes 324. The motor driven rollers may be run with a single motor or multiple motors. Additionally or alternatively, the motor driven rollers may be adjacent to non-driven rollers.

FIGS. 4-6 show side views of various stages or states in an example of a re-organizing process that may be performed by an example item storage system 100 for moving and sorting items 110. As depicted, the storage system 100 includes a storage structure 120, items 110, two platforms 130, and a conveyance mechanism 136. However, example storage systems 100 may include additional or alternative elements. The storage structure 120 in FIG. 4 includes two support surfaces 124 (individually referenced as a lower support surface 124A and an upper support surface 124B). The platforms 130 can move the item from the upper support surface 124B to the lower support surface 124A. Both platforms 130 have an item movement device 134 (individually labeled as a right item movement device 134A and a left item movement device 134B).

Turning to FIG. 4, the right platform 130A and the left platform 130B are positioned at the same height along the storage structure 120, e.g., in-line with the lower support surface 124A. The right item movement device 134A is aligned with the item 110 positioned on the lower support surface 124A. The right item movement device 134A extends from the right platform 130A and engages with the item 110. The right item movement device 134A can engage the item 110 at any point along the lower support surface 124A in direction 410. For example, the right item movement device 134A can engage the item 110 on the right side of the lower support surface 124A and push the item 110 to the left side of the lower support surface 124A along direction 410. The right item movement device 134A can push the item 110 from the left side of the lower support surface 124A onto the left platform 130B.

FIG. 5 shows item 110 after it has been pushed onto the left platform 130 by the right item movement device 134A. The left platform 130B can raise the item 110 from the lower support surface 124A to the upper support surface 124B along direction 420. The left platform 130B can raise the item 110 to be aligned with the upper support surface 124B. The right platform 130A may remain aligned with the lower support surface 124A or may move along direction 420 to be aligned with the upper support surface 124B. The left and right platforms 130 can move along direction 420 and maintain alignment or can move between support surfaces 124 independently.

FIG. 6 illustrates after the left platform 130B has aligned the item 110 with the upper support surface 124B. The left item movement device 134A can push the item 110 along direction 430. The item 110 can slide along the upper support surface 124B from the left side of the upper support surface 124B. The item 110 can be pushed onto the conveyance mechanism 136. The conveyance mechanism 136 can transport the item to an area outside of the storage structure 120.

As noted previously, embodiments may have additional or alternative elements. For example, the lower support surface 124A and upper support surface 124B are shown as being adjacent, however, there may be additional support surfaces 124 between the two. The conveyance mechanism 136 is depicted as being coupled with the upper support surface 124B, although in various embodiments, there may not be a conveyance mechanism 136 or the conveyance mechanism 136 may be coupled with the lower support surface 124A or positioned beneath the storage structure 120. Additionally or alternatively, the conveyance mechanism 134 can be used to bring items into the item storage system 100. Both platforms 130 are shown having an item movement device 134, however, only one platform may have an item movement device 134. For example, the right item movement device 134A may push an item 110 from the lower support surface 124A onto the left platform 130B. The left platform 130B then raises the item 110 to the upper support surface 124B and the right item movement device 134B pulls the item 110 from the left platform 130B onto the upper support surface 124B.

Figure 7:
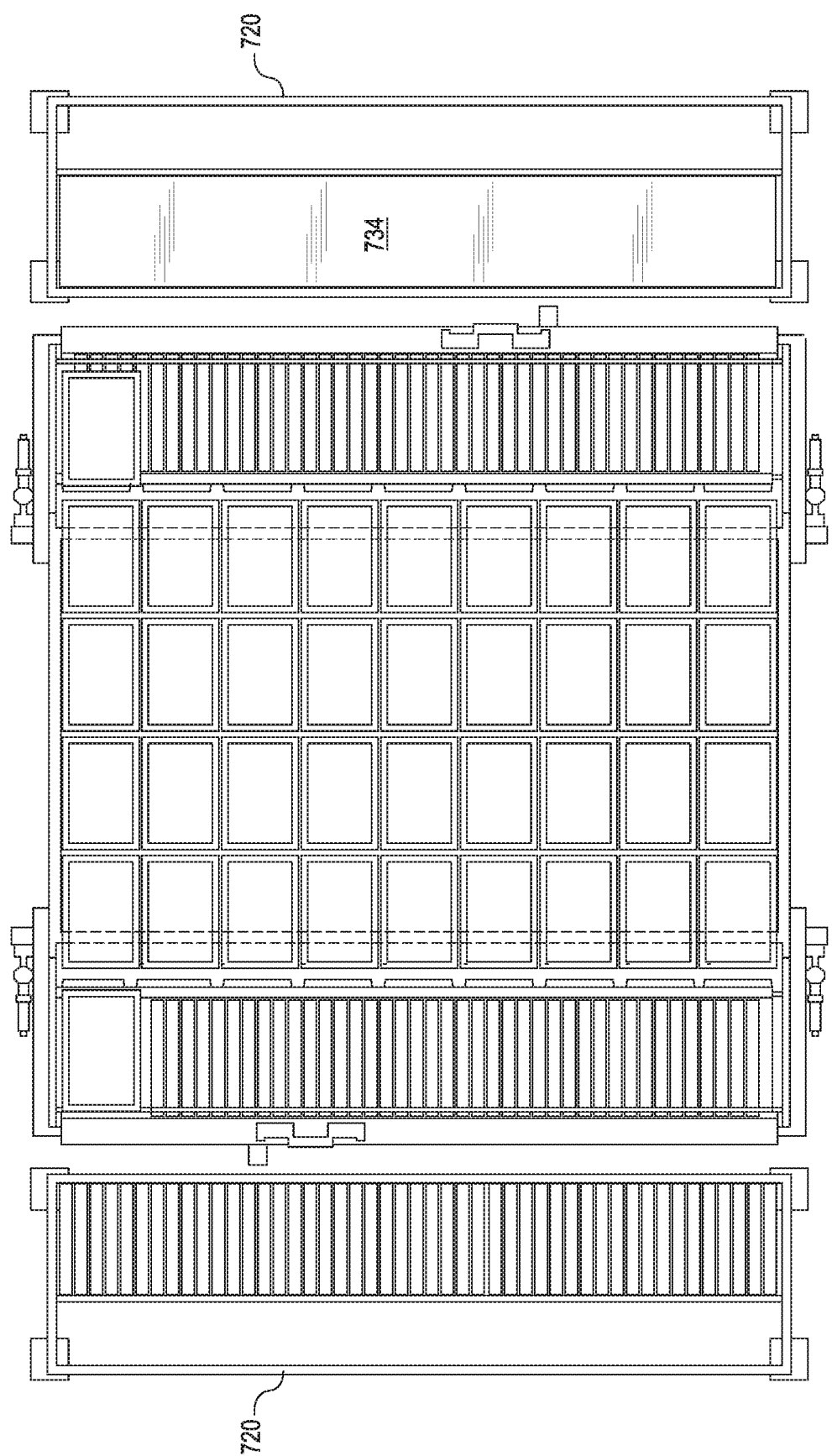
FIG. 7 illustrates an example item storage system including an external conveyance structure that may be utilized in particular embodiments of the storage system shown in FIG. 1.

FIG. 7 illustrates a top view showing an example item storage system 100 including an external conveyance structure 720. The external conveyance structure 720 can move items 110 towards and/or away from the item storage system 100. The external conveyance structure 720 can include an external conveyance mechanism 734 which can receive and transport the items 110. For example, the external conveyance mechanism may be a conveyor, rollers, or tracks. In various embodiments, items 110 are pushed off of a platform 130 onto the external conveyance mechanism 734. The items 110 can be pushed off the platform 130 using the right angle transfer system 200 or the item movement device 134.

Figure 8:
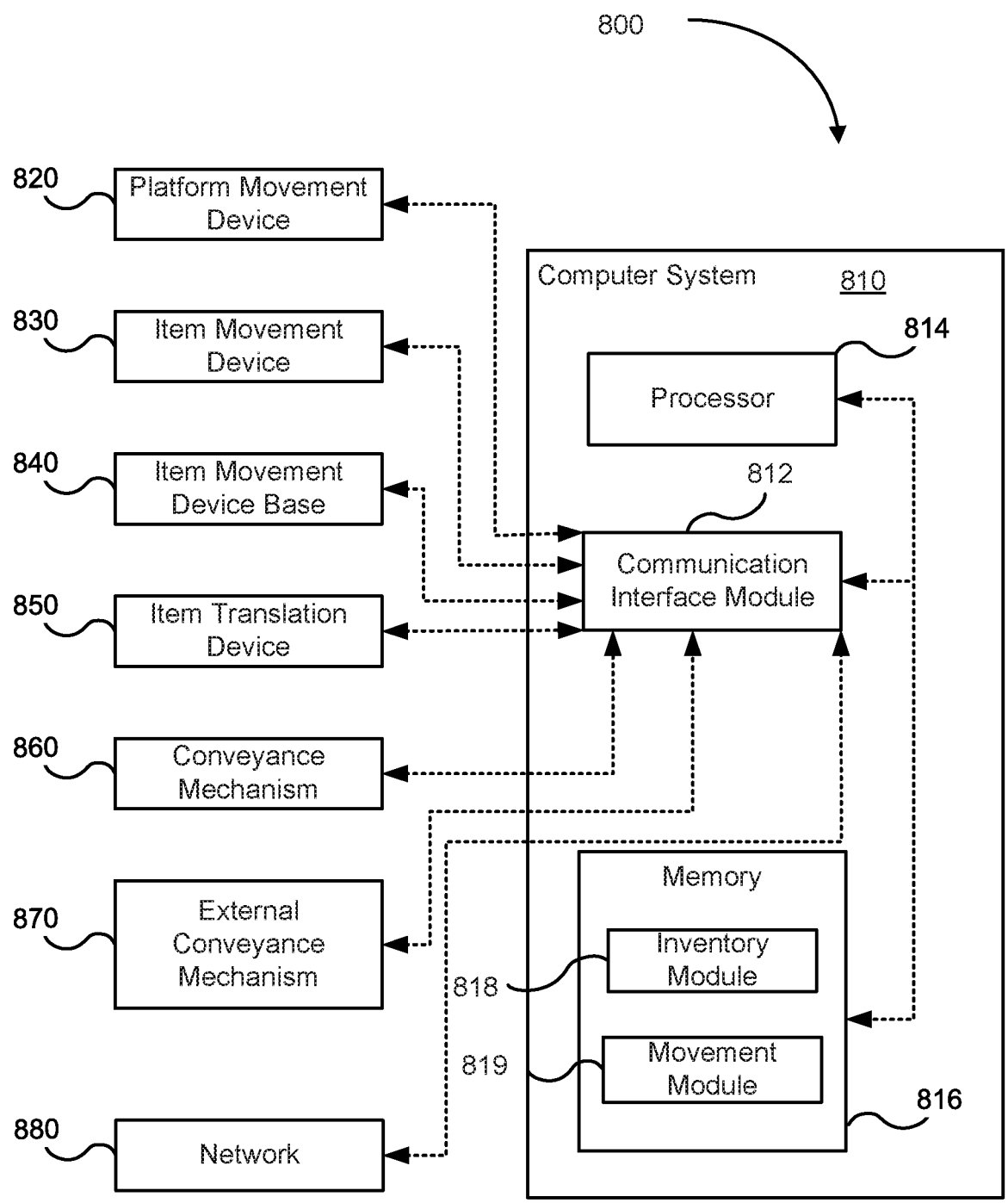
FIG. 8 is a block diagram illustrating components of an item storage system according to certain embodiments.

FIG. 8 is a block diagram illustrating components of an item storage system 100 according to certain embodiments. As shown in FIG. 8, the item storage system 100 includes a computer system 810, a platform movement device 820, an item movement device 830, an item movement device base 840, an item translation device 850, a conveyance mechanism 860, an external conveyance mechanism 870, and a network 880. In general, the computer system 810 may function as a controller that controls other components of the item storage system 100, for example, as described further below.

The platform movement device 820 may correspond to the platform movement device 132, the rack and pinion system 332, or any other suitable components capable of moving the platform 130 up and down the storage structure 120. The item movement device 830 may correspond to the item movement device 134, the movement arm 334, or any other suitable components for pushing, pulling, and/or otherwise moving items 110 onto, along, and/or off of the platform 130 and/or the storage structure 120. The item movement device base 840 may correspond to the arm base 335 or any other suitable element for moving the item movement device 134 along the length of the platform 130. The item translation device 850 may correspond to the item translation device 136, the rollers 336, or any other suitable components for moving the items 110 along the length of the platform 130. The conveyance mechanism 860 may correspond to the conveyance mechanism 126 or any other suitable components capable of moving items 110 into and/or out of the storage structure 120. The external conveyance mechanism 870 may correspond to external conveyance mechanism 734 or any other suitable elements which can receive and transport the items 110. The network 880 may provide communication between the computer system 810 and other components, such as other computer systems. The platform movement device 820, item movement device 830, item movement device base 840, item translation device 850, conveyance mechanism 860, external conveyance mechanism 870, and the network 880 may function as appropriate inputs and/or outputs for control of the item storage system 100 by the computer system 810.

The illustrated computer system 810 includes a communication interface module 812, a processor 814, a memory 816, an inventory module 818, and a movement module 819. The computer system 810 may represent a single component, multiple components located at a central location within the item storage system 100, or multiple components distributed throughout item storage system 100. In general, the computer system 810 may include any appropriate combination of hardware and/or software suitable to provide the described functionality.

The processor 814 is operable to execute instructions associated with the functionality provided by the computer system 810. The processor 814 may comprise one or more general purpose computers, dedicated microprocessors, or other processing devices capable of communicating electronic information. Examples of the processor 814 include one or more application-specific integrated circuits (ASICs), field programmable gate arrays (FPGAs), digital signal processors (DSPs) and any other suitable specific or general purpose processors.

The memory 816 stores processor instructions, state information for the various components of the item storage system 100, and/or any other appropriate values, parameters, or information utilized by computer system 810 during operation. The memory 816 may represent any collection and arrangement of volatile or nonvolatile, local or remote devices suitable for storing data. Examples of the memory 816 include, but are not limited to, random access memory (RAM) devices, read only memory (ROM) devices, magnetic storage devices, optical storage devices or any other suitable data storage devices.

The communication interface module 812 facilitates communication between computer system 810 and other components of the item storage system 100, including information and/or instructions conveyed between any of the platform movement device 820, the item movement device 830, the item movement device base 840, the item translation device 850, the conveyance mechanism 860, the external conveyance mechanism 870, the inventory module 818, and the movement module 819. These communications may represent communication of any form appropriate based on the capabilities of the computer system 810 and may include any suitable information. Depending on the configuration of the computer system 810, communication interface module 812 may be responsible for facilitating either or both of wired and wireless communication between the computer system 810 and the various components of the item storage system 100. In particular embodiments, the computer system 810 may communicate using communication protocols such as ethernet, 802.11, Bluetooth, or Infrared Data Association (IrDA) standards.

In general, the inventory module 818, the movement module 819, and the communication interface module 812 may each represent any appropriate hardware and/or software suitable to provide the described functionality. In addition, as noted above, computer system 810 may, in particular embodiments, represent multiple different discrete components and any or all of the inventory module 818, the movement module 819, and the communication interface module 812 may represent components physically separate from the remaining elements of computer system 810. Moreover, any two or more of the inventory module 818, the movement module 819, and the communication interface module 812 may share common components. For example, in particular embodiments, the inventory module 818 and the movement module 819 represent computer processes executing on the processor 814 and communication interface module 812 comprises a wireless transmitter, a wireless receiver, and a related computer process executing on processor 814.

The inventory module 818 may identify and determine information about items 110 in the item storage system 100. For example, the inventory module 818 may determine the type, weight, size, or ranking of the item 110. The inventory module 8181 may additionally or alternatively identify items 110 based on the unique identifier 114.

The movement module 819 may send movement instructions to any or all of the platform movement device 820, the item movement device 830, the item movement device base 840, the item translation device 850, the conveyance mechanism 860, and the external conveyance mechanism 870. For example, the movement module 819 may send movement instructions that may cause suitable actuation to move an item 110 to a target location on the storage structure 120. Additionally or alternatively, the movement module 819 may send movement instructions based on information received from the inventory module 818. The inventory module 818 may be capable of receiving orders or otherwise handling requests relating to retrieving, storing, or re-arranging particular items 110 in the item storage system 100

Figure 9:
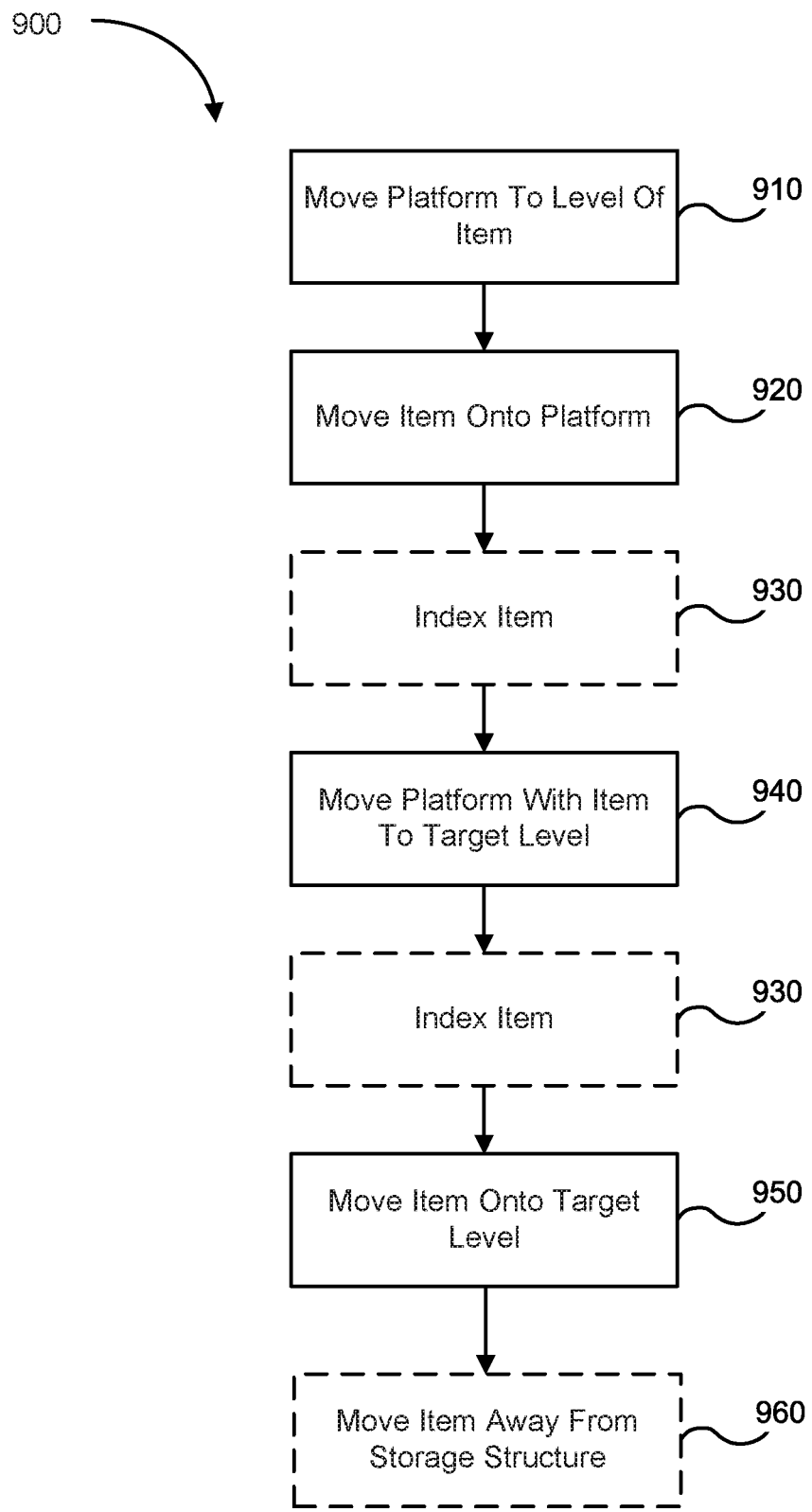
FIG. 9 is a flowchart illustrating an example process that may be performed relative to an item storage system according to certain embodiments.

FIG. 9 is a flowchart illustrating an example process 900 that may be performed relative to an item storage system 100 according to certain embodiments. Some or all of the process 900 (or any other processes described herein, or variations and/or combinations thereof) may be performed under the control of one or more computer systems configured with executable instructions, such as the modules described herein, and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. Moreover, unless indicated otherwise, acts shown in the processes are not necessarily performed in the order shown, and/or some acts can be omitted in embodiments.

The process at 910 can include moving a platform 130 to a level of the storage structure 130 containing a target item 110. For example, this may entail the movement module 819 sending movement instructions to the platform movement device 132 to move the platform 130 up or down along the height of the storage structure 120 until the platform 130 reaches the same level as the target item 110. The movement instructions may be based on information received from the inventory module 818, such as the item's type, description, size, weight, or any other characteristic of the item. In various embodiments, two platforms 130 can be moved to the level containing the target item 110.

The process at 920 can include moving the target item 110 onto the platform 130. The target item 110 may be moved by the item movement device 134 (e.g., in response to movement instructions from the movement module 819). For example, the item movement device 134 may push the target item 110 onto a platform 130. However, the item movement device 134 may pull the target item 110 onto a platform 130 (e.g., via operation of the item movement device base 840). In various embodiments, the item movement device 134 can be moved along the length of the platform 130 to align with the target item 110 before it pushes the target item 110 onto a platform 130.

The process at 940 can include moving the platform 130 containing the target item 110 to a target level of the storage structure 120. For example, this may entail the movement module 819 sending movement instructions to the platform movement device 132 to move the platform 130 up or down along the height of the storage structure 120 until the platform 130 reaches the target level of the storage structure 120. The target level may contain the conveyance mechanism 126 for moving the target item 110 away from the storage structure 120. However, the target level may be a level of the storage structure 120 where the target item 110 can be stored in the storage structure 120.

The process at 950 can include moving the target item 110 onto the target level of the storage structure 120. In various embodiments, the target item 110 is pushed off of the platform 130 onto the target level by the item movement device 134. However, the target item 110 may be pulled off of the platform 130 onto the target level by the item movement device 134. In some embodiments, the target item 110 is pushed onto the conveyance mechanism 126. Moving the target item 110 onto the target level at 950 can entail the movement module 819 sending movement instructions that cause the item movement device base 840 to position the item movement device 134 and/or cause the item movement device 134 to actuate to move the item 110.

In some embodiments, the process at 960 can include moving the target item 110 away from the storage structure 120. For example, the conveyance mechanism 126 can move the target item 110 away from the storage structure 120. Moving the target item 110 away from the storage structure 120 at 960 can entail the movement module 819 sending movement instructions that cause the conveyance mechanism 860 or the external conveyance mechanism 870 to move the item 110.

In some embodiments, the process at 930 can include indexing the target item 110. This may entail the movement module 819 providing movement instructions to any suitable combination of elements to cause any suitable series of actions for re-locating one or more items 110 according to target locations identified by the inventory module 818. For example, any of the platform movement device 820, item movement device 830, item movement device base 840, or item translation device 850 may be activated in suitable sequence to allow an item 110 to be indexed or re-located to another place within the storage structure 120, such as to facilitate access to another item 110. As an illustrative example, the translation device 136 may move the target item 110 along the length of the platform 130 to align with a specific lane in the storage structure 120 and the target item 110 once aligned with the lane may be moved by the item movement device 134. In some embodiments, the target item 110 may be indexed multiple times during the process 900 for proper alignment.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The term "perpendicular" is to be construed as being at an angle of generally ninety degrees to a surface, including angles below or above ninety degrees. The term "horizontal" is to be construed as being generally ninety degrees to vertical, including angles below or above ninety degrees. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A storage system, comprising:
   a shelving unit comprising a plurality of shelves in an interior of the shelving unit, the plurality of shelves spanning between vertical support structures and spaced apart along a height of the vertical support structures, each shelf configured to receive and support a plurality of totes; and
   a first platform and a second platform extending laterally outward from opposing sides of the shelving unit, each platform coupled with vertical support structures and moveable up or down along the height of the shelving unit, each platform comprising:
      an arm moveable along a width-wise direction from an exterior of the shelving unit toward the interior of the shelving unit and engageable with one of the plurality of totes to push the tote on to or off of the plurality of shelves;
      an arm base supporting the arm and moveable along an edge of the platform along a depth-wise direction perpendicular to the width-wise direction; and
      a conveyor to move the tote along the depth-wise direction after the tote has been pushed onto the platform.

2. The storage system of claim 1, wherein the shelving unit further comprises a conveyance mechanism disposed in the interior of the shelving unit and configured to move totes into the interior of the shelving unit or from the interior of the shelving unit to the exterior of the shelving unit along the depth-wise direction.

3. The storage system of claim 1, wherein:
   the arm on the first platform pushes the tote out of the interior of the shelving unit onto the second platform;
   the tote is moved by at least one of: (a) the conveyor on the second platform along the depth-wise direction, or (b) the second platform along the height of the shelving unit; and the arm on the second platform pushes the tote off of the second platform into the interior of the shelving unit.

4. The storage system of claim 1, wherein the arm of the first platform is configured to push totes from the first platform onto the shelving unit and from the shelving unit onto the second platform.

5. The storage system of claim 1, wherein one shelf includes lanes distributed along the depth-wise direction, each lane configured to receive totes and extending across the shelf in the width-wise direction.

6. The storage system of claim 1, further comprising an external conveyance structure adjacent to one of the first or second platforms and configured to facilitate: (a) transfer of totes away from the platform or (b) transfer of totes to the platform.

7. A storage system, comprising:
a storage structure with openings allowing passage of a plurality of containers between an interior and an exterior of the storage structure, the plurality of containers supported in the interior of the storage structure; and
a pair of platforms extending laterally outward from opposing sides of the storage structure, each platform coupled with the exterior of the storage structure and moveable along a height of the storage structure, each platform comprising:
a container movement device configured to move containers through an opening along a first direction from the exterior of the storage structure to the interior of the storage structure; and
a container translation device configured to move an container along a second direction perpendicular to the first direction.

8. The storage system of claim 7, wherein the container movement device on one of the platforms comprises an arm configured to engage a container and push the container along the first direction from the exterior of the storage structure through the opening to the interior of the storage structure.

9. The storage system of claim 8, wherein the arm comprises a chain transformable from a storage state to an engagement state.

10. The storage system of claim 7, wherein the storage structure further comprises a rack engaged with a motor mounted on one of the pair of platforms, the motor causing the platform to move along the height of the storage structure.

11. The storage system of claim 7, wherein the container movement device on one of the platforms is moveable along the platform in the second direction.

12. The storage system of claim 7, wherein the opening is defined by support surfaces, each support surface able to support a plurality of containers.

13. The storage system of claim 12, wherein one of the support surfaces has a plurality of lanes extending along the first direction for receiving containers.

14. The storage system of claim 7, wherein the storage structure further comprises a container conveyor in the interior of the storage structure for moving containers from the interior of the storage structure to a secondary environment.

15. A platform configured to extend laterally outward from a storage structure having an interior for supporting a plurality of containers and an opening for moving the containers between the interior and an exterior, the platform comprising:
a platform movement device configured to move the platform along a height of the storage structure;
an container movement device configured to move containers through the opening along a first direction from the exterior of the storage structure to the interior of the storage structure; and
an container translation device configured to move an container along a second direction perpendicular to the first direction.

16. The platform of claim 15, wherein the container translation device comprises motor driven rollers individually controlled to move the containers at increments along the second direction.

17. The platform of claim 16, wherein the motor driven rollers move the containers at increments to align the containers with lanes inside the storage structure.

18. The platform of claim 15, wherein the container movement device comprises an arm configured to push containers through the opening of the storage structure.

19. The platform of claim 15, wherein the container movement device is moveable along the platform in the second direction.

20. The platform of claim 15, wherein a received container received on the platform is moveable in the second direction by the container movement device and pushable onto the storage structure by the container movement device along the first direction.

* * * * *